United States Patent [19]

Stottlemyer

[11] Patent Number: 4,641,339

[45] Date of Patent: Feb. 3, 1987

[54] VARIABLE BANDWIDTH HANDSFREE TELEPHONE USING SWITCHED CAPACITOR FILTERING

[75] Inventor: William O. Stottlemyer, Raleigh, N.C.

[73] Assignee: ITT Corporation, New York, N.Y.

[21] Appl. No.: 716,438

[22] Filed: Mar. 27, 1985

[51] Int. Cl.$^4$ .......................... H04B 3/20; H04M 9/08
[52] U.S. Cl. ...................................... 379/391; 379/409
[58] Field of Search .............. 179/170.2, 170.6, 170.8, 179/100 L, 81 B; 381/93; 455/79; 333/173

[56] References Cited

U.S. PATENT DOCUMENTS 3,567,873  3/1971  Peroni ............................... 179/170.2

FOREIGN PATENT DOCUMENTS 0922003  3/1963  United Kingdom .................. 381/93

OTHER PUBLICATIONS

"An Electrically-Programmable Switched Capacitor Filter" D. J. Allstot et al., IEEE Journal of Solid-State Circuits, vol. SC-14, No. 6, Dec. 1979, pp. 1034–1041.
IEEE Standard Dictionary of Electrical and Electronics Terms, second edition, The Institute of Electrical and Electronics Engineers, Inc. New York, N.Y., 1977, p. 94.

*Primary Examiner*—Gene Z. Rubinson
*Assistant Examiner*—R. Vaas
*Attorney, Agent, or Firm*—John T. O'Halloran; Thomas F. Meagher

[57] ABSTRACT

This invention is a technique for providing isolation between the two channels of a handsfree telephone subset without resorting to gain switching or gain variations in the transmission path. The invention involves separating the frequency spectrum into two portions and allowing the stronger signal to capture a major portion of that available spectrum. Switched capacitor filters are used to control the degree of frequency bandwidth allocated to each channel while the filters are clocked from a common source assuring no possibility of overlap in the frequency spectrum. The affect of varying the bandwidth is much less noticeable than varying the amplitude and, therefore, creates much less user irritation.

2 Claims, 4 Drawing Figures

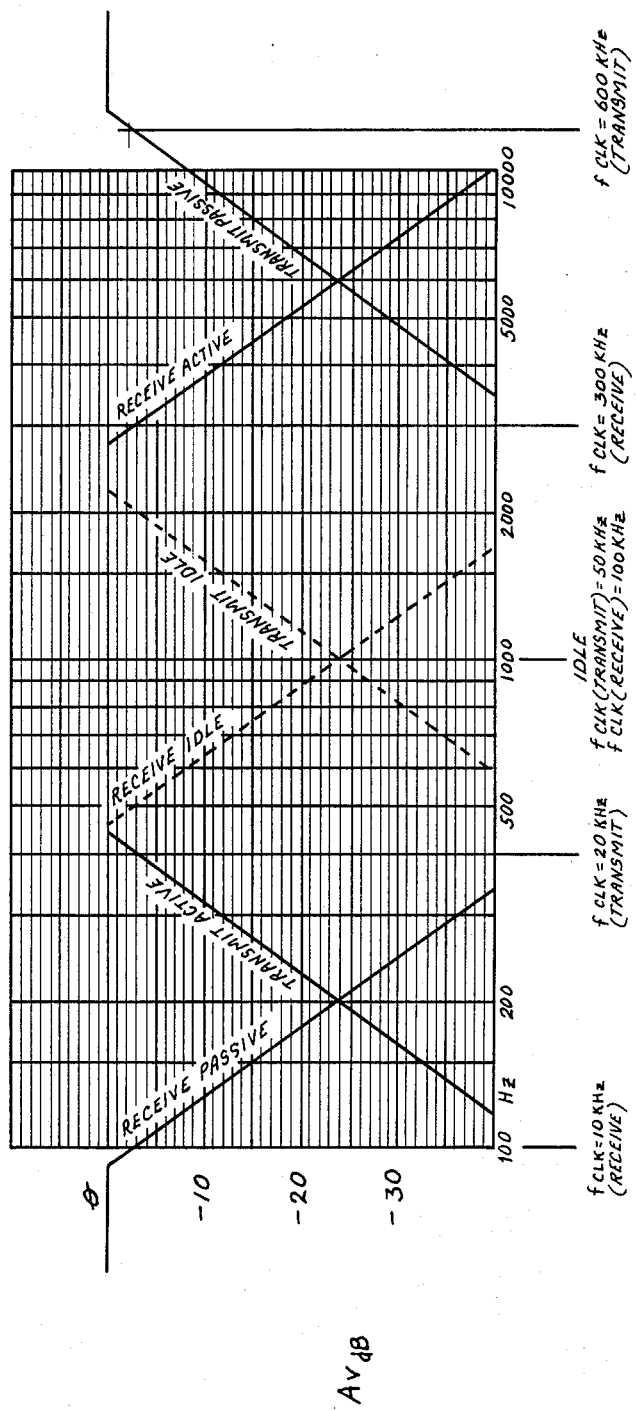

VARIABLE BANDWIDTH HANDSFREE TELEPHONE USING SWITCHED CAPACITOR FILTERING

BACKGROUND OF THE INVENTION

1. Field of the Invention

The present invention relates to handsfree telephones having multiple channels.

2. Description of the Prior Art

Handsfree telephone technology of the known prior art utilizes voice switching or gain variation techniques to overcome the limitations imposed by the acoustic path between the microphone and loudspeaker and the imperfect sidetone cancellation provided by the hybrid. Voice switching is accomplished by the use of analog switches or field effect transistors (FET's) to alternately turn the communication channels on and off. The switches are controlled by the transmit signal, receive signal, or a combination of both signals in a comparator circuit. This known process of switching the communication channels in the transmission path on and off creates an annoying side affect known as clipping. Clipping occurs at the leading edge of the switched waveform and usually causes a portion of the spoken text to be truncated.

The variable gain method, also known in the prior art, although causing less noticeable clipping, still can create "pumping" or "breathing" sounds as the gain moves up and down and can be equally disturbing to the handsfree telephone user, as well as to the distant telephone subscriber. For these reasons, most telephone subscribers experienced in the use of handsfree telephony would prefer a full duplex subset where no switching or gain changing ever occurs. However, current state-of-the-art full duplex handsfree telephones suffer from low transmission levels dictated by the lack of acoustical isolation. Digital signal processing may overcome these limitations in time.

SUMMARY OF THE INVENTION

The present invention describes a method of providing isolation between the two communication channels of a handsfree telephone subset without resorting to gain switching or gain variations in the signal transmission path. The method utilized in this invention involves separating the frequency spectrum into two portions and allowing the stronger signal to capture a major portion of the available spectrum. Switched capacitor filters are used to control the degree of frequency bandwidth allocated to each channel within the transmission path while the filters are clocked from a common source to make sure that there is no possibility of overlap in the frequency spectrum. The affect of varying the bandwidth of the signal is much less noticeable to a telephone subscriber than varying the amplitude of the signal and, therefore, is more user friendly than are systems of the known prior art.

BRIEF DESCRIPTION OF THE DRAWINGS

FIG. 4 is a transmit and receive frequency versus dB isolation curve illustrative of the advantages of the present invention.

DESCRIPTION OF THE PREFERRED EMBODIMENT

Figure 1:
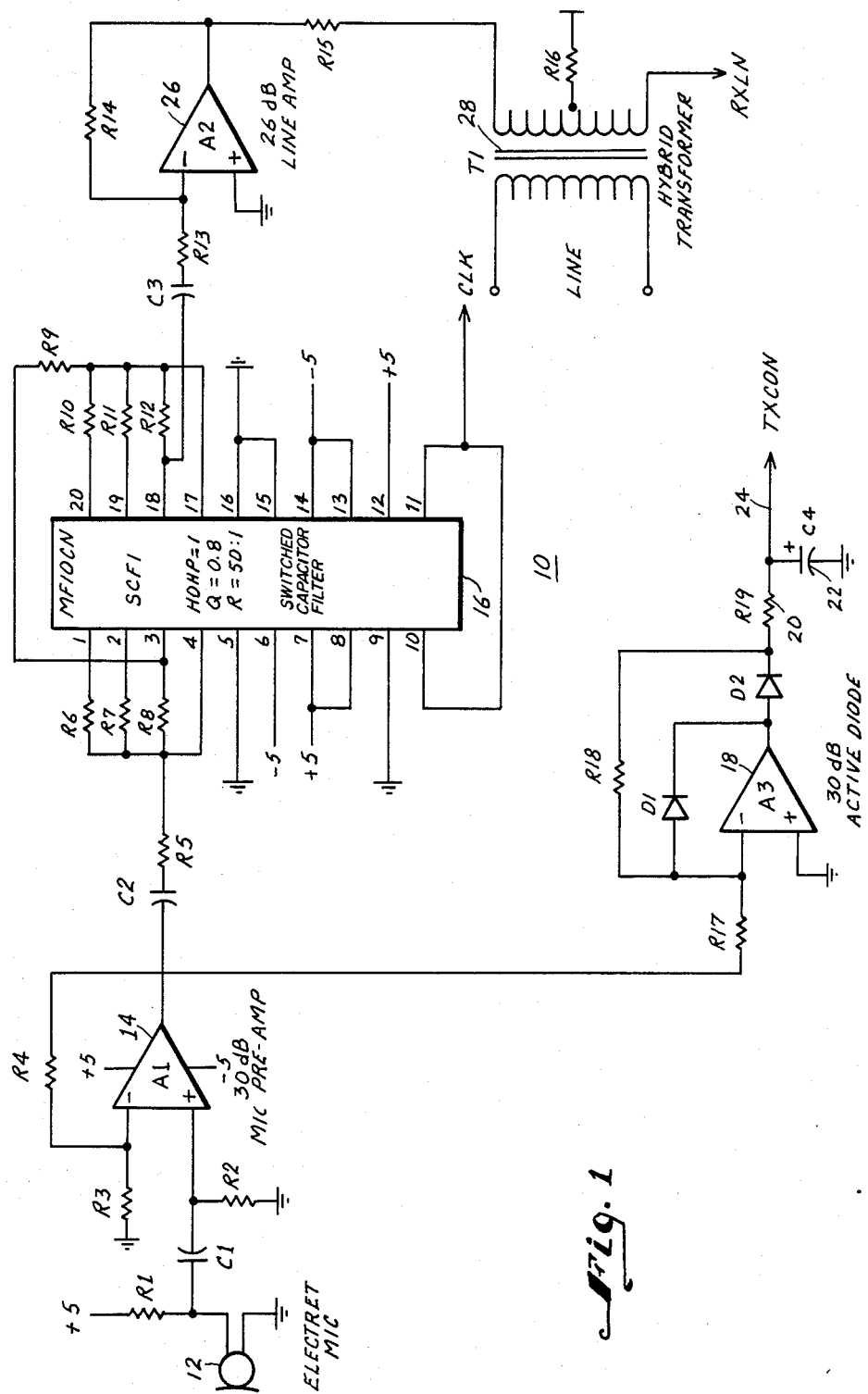
FIG. 1 is a schematic diagram of the transmitting circuitry of a variable bandwidth handsfree telephone in accordance with the present invention.

Referring now to FIG. 1, a circuit diagram of the transmit channel, of this invention is illustrated generally at 10. An electret microphone 12 is coupled to a preamplifier 14. Circuit gains resulting from the associated resistive network are adjusted to provide approximately a −30 dBV signal at the preamplifier 14 output with a 74 dB SPL acoustic drive at the microphone 12 diaphragm. The transmit switched capacitor filter (SCF1) 16 is configured to be a four pole high pass filter with a passband gain of one and a corner frequency of 2 kHz in the idle state and has the output of preamplifier 14 coupled thereto. The preamplifier 14 output is also coupled to active diode A3 at 18 which provides 30 dB of signal amplification and which also rectifies the audio signal. The rectified output from diode 18 is filtered by a filter consisting of resistor 20 and capacitor 22 and is a signal approximately equal to the peak value of the input signal times the gain of the amplifier. This DC voltage is designated TXCON (transmit control voltage) and is coupled to the Control Differential Amplifier 306 non-inverting input and is used to drive the VCO (voltage controlled oscillator) 308, described with reference to FIG. 3.

The output of the switched capacitor filter 16 is amplified by a line amplifier 26 and then transformer coupled at transformer 28 as the receive control voltage (RXLN) to control differential amplifier 306.

Figure 2:
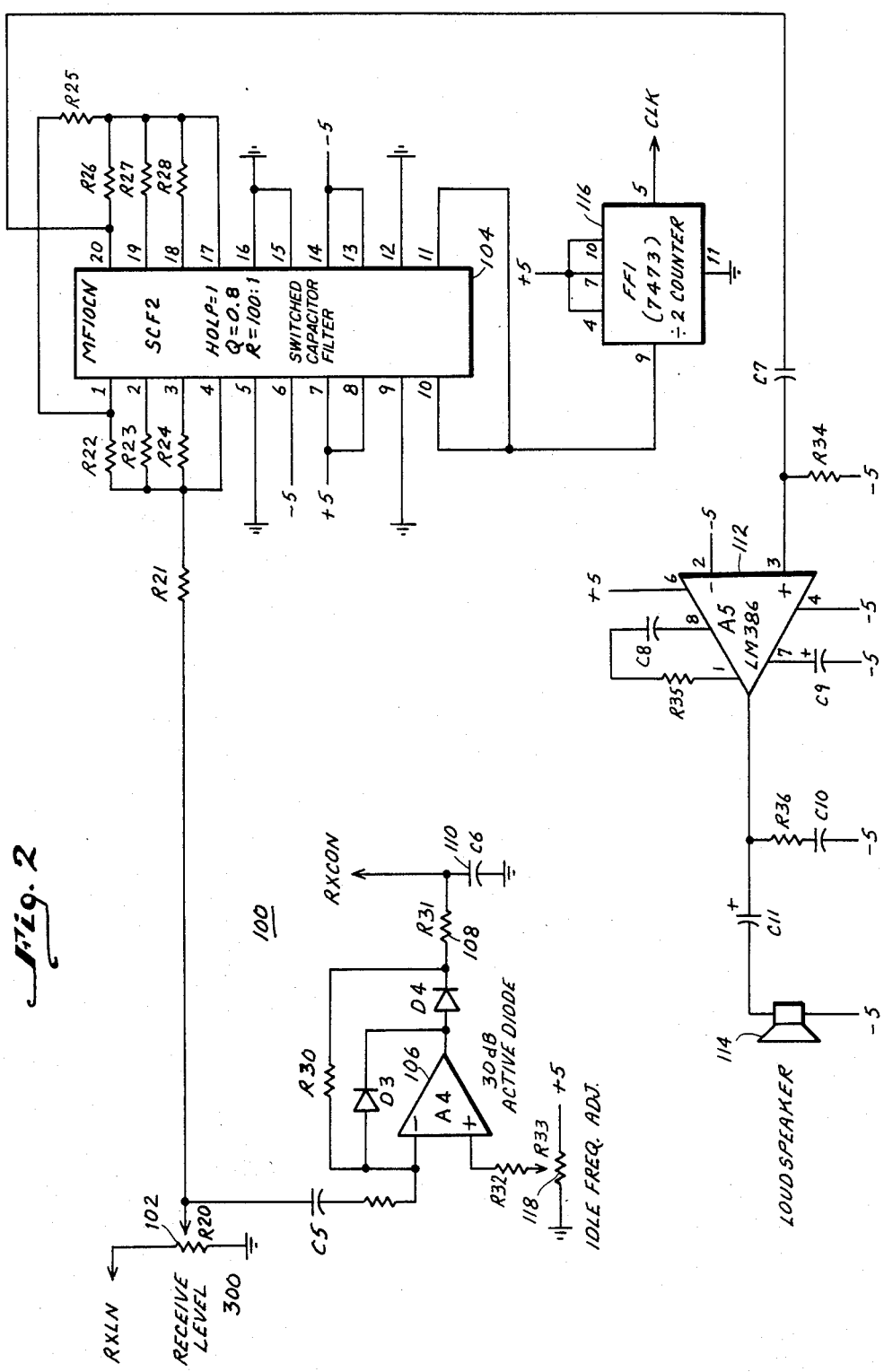
FIG. 2 is a schematic diagram of the receiving circuitry of a variable bandwidth handsfree telephone in accordance with the present invention.

Referring now to FIG. 2, the receive channel is illustrated generally at 100. The receive channel receives its input from the receive port of the hybrid transformer 28 and feeds potentiometer 102 which serves as a receive level control. Switched capacitor filter SCF2 at 104 is configured as a four pole low pass filter with a passband gain of one and a corner frequency of 500 Hz in the idle state. The receive level control potentiometer output is also coupled as a portion of the signal to active diode A4 at 106 which provides 30 dB of signal amplification and also rectifies the signal. The rectified output from active diode 106 is filtered by a filter comprised of resistor 108 and capacitor 110 and is approximately equal to the peak value of the input signal times, the gain of the amplifier. This DC voltage is designated RXCON (receive control voltage) and is coupled to the Control Differential Amplifier 306 inverting input. The output of the receive switched capacitor filter 104 drives an audio power amplifier 112 which provides 34 dB of signal amplification to drive a loudspeaker 114. A divide by two counter 116 provides a clock as illustrated.

Figure 3:
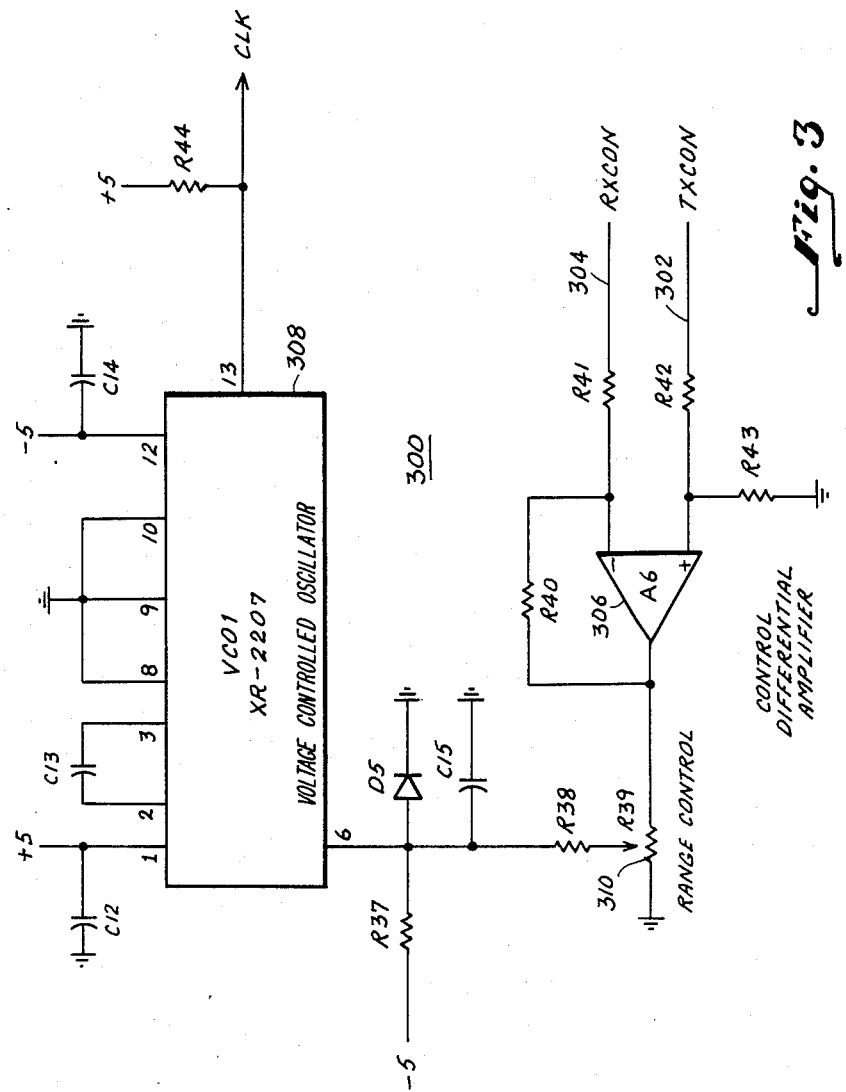
FIG. 3 is a clock circuit useful in the invention described with reference to FIGS. 1 and 2.

Referring now to FIG. 3, a clock circuit 300 for controlling the switched capacitor filters 16 and 104 to provide bandwidth control, and including a voltage controlled oscillator (VCO) 308 and a differential amplifier 306 is illustrated.

In order to provide effective channel isolation, it is required that both channels (transmit and receive) never allow their respective signals to occupy the same portion of the audio frequency spectrum simultaneously. This requirement is guaranteed by linking both single channel filters, 16 and 104, to the common clock and control circuit 300. This clock circuit 300 monitors the signal levels of the two channels (transmit on line 302 and receive on line 304) and varies the clock frequency according to the stronger signal. Differential amplifier 306 generates an output to control the VCO 308 to accomplish the foregoing. Potentiometer 118 is adjusted to provide an idle state dc voltage of −1 volt at pin 6 of the VCO 308 which sets the VCO idle frequency to 200 kHz. With this clock frequency, the transmit switched capacitor filter 16 sets its corner frequency to 2 kHz while the receive switched capacitor filter 104 sets its corner frequency to 500 Hz. At the point where the bandwidth envelopes cross, as shown by FIG. 4, the response will be 24 dB below the passband gain.

If the transmit signal increases in amplitude, this will cause the dc voltage on pin 6 of the VCO 308 to go more positive which in turn causes the clock frequency to decrease. As the clock frequency drops, the lower end of the transmit response curve moves toward the lower end of the audio spectrum which was previously occupied by the receive channel. The upper end of the receive curve is simultaneously moved away from the transmit curve thus preserving the 24 dB isolation notch.

Conversely, if the receive signal amplitude increases, the voltage on pin 6 of the VCO 308 will go more negative which will cause the clock frequency to increase. This action moves the low end of the transmit curve higher into the audio spectrum allowing room for the expanding receive curve.

Potentiometer 310 limits the swing of the output of the control differential amplifier 306 thus limiting the frequency swing of the VCO 308. Under normal operating conditions the VCO 308 clock frequency will swing from approximately 20 kHz to 600 kHz which will swing the transmit corner frequency from 400 Hz to 12 kHz and the receive corner frequency from 100 to 3000 Hz.

While the present invention has been described in connection with a preferred embodiment thereof, it is to be understood that additional embodiments, modifications and applications which will become obvious to those skilled in the art are included within the spirit and scope of the invention as set forth by the claims appended hereto.

I claim:

1. A circuit for providing isolation between two communication signals transmitted in two communication channels, on a transmission path having a frequency bandwidth, comprising:

means for providing separate portions of the frequency bandwidth of said transmission path respectively for each of said channels at selected times, said providing means including a switched capacitor filter in each channel, and a clocking circuit for monitoring the communication signal levels of said two channels and generating an output having a frequency indicative of a stronger of the two signals; and means for controlling said providing means to prevent simultaneous overlapping in time of the portions, such that the clocking circuit output frequency is varied and controls the bandwidth of each of said channels, as a function of said stronger of the two signals, said means for controlling including a voltage controlled oscillator responsive to the output of said clocking circuit for varying the switching frequencies of the switched capacitor filters in each channel to maintain a predetermined degree of signal isolation between said channels.

2. A circuit in accordance with claim 1, for use in a handsfree telephone wherein said two communication channels are transmit and receive channels for transmission of speech and wherein the switching frequencies of said switched capacitor filters determine the bandwidth of said transmit and receive channels.

* * * * *